US012584744B2

(12) United States Patent
Kim et al.

(10) Patent No.: US 12,584,744 B2
(45) Date of Patent: Mar. 24, 2026

(54) CASCADED OPTICAL MODULATION SYSTEM

(71) Applicant: NORTHROP GRUMMAN SYSTEMS CORPORATION, Falls Church, VA (US)

(72) Inventors: Steven M. Kim, Santa Clarita, CA (US); Daniel A. Tazartes, West Hills, CA (US); Gregory A. Zimmerman, Sandy, UT (US); Leonard A. Atkinson, Herndon, VA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 153 days.

(21) Appl. No.: 18/393,295

(22) Filed: Dec. 21, 2023

(65) Prior Publication Data

US 2025/0207919 A1    Jun. 26, 2025

(51) Int. Cl.
   *G01C 19/72*      (2006.01)
   *G02F 1/01*       (2006.01)
(52) U.S. Cl.
   CPC .......... *G01C 19/722* (2013.01); *G02F 1/0115* (2013.01); *G02F 1/0121* (2013.01); *G02F 2203/26* (2013.01); *G02F 2203/50* (2013.01)
(58) Field of Classification Search
   CPC ................ G01C 19/722; G01C 19/721; G02F 1/0115; G02F 1/0121; G02F 2203/26; G02F 2203/50
   See application file for complete search history.

(56) References Cited

U.S. PATENT DOCUMENTS

| | | | | |
|---|---|---|---|---|
| 5,137,360 A | * | 8/1992 | Ferrar .................. | G01C 19/721 |
| | | | | 356/464 |
| 5,260,768 A | * | 11/1993 | Cordova .............. | G01C 19/721 |
| | | | | 356/462 |
| 6,175,412 B1 | * | 1/2001 | Drevillon .............. | G02F 1/0327 |
| | | | | 359/278 |

(Continued)

FOREIGN PATENT DOCUMENTS

| | | | | |
|---|---|---|---|---|
| CN | 112797970 A | 5/2021 | | |
| CN | 113078543 A | 7/2021 | | |
| KR | 19980077897 A | * | 11/1998 | ............. G06F 17/10 |

OTHER PUBLICATIONS

WOISR (Notification of Transmittal of the International Search Report and the Written Opinion of the International Searching Authority, or the Declaration), for PCT/US2024/053727, mailed Feb. 12, 2025.

*Primary Examiner* — Mohamed K Amara
(74) *Attorney, Agent, or Firm* — Tarolli, Sundheim, Covell & Tummino LLP

(57) ABSTRACT

One example includes an optical system. The system includes a laser configured to generate an optical beam and an optical modulation system comprising a plurality of optical modulators arranged in a cascaded sequence. Each of the optical modulators can be configured to provide successive modulation of the optical beam in the cascaded sequence to provide a modulated optical beam. The system further includes an optical assembly configured to receive the modulated optical beam and to implement the modulated optical beam for an optical functional application.

19 Claims, 3 Drawing Sheets

(56)           References Cited

U.S. PATENT DOCUMENTS

| | | | |
|---|---|---|---|
| 6,438,234 B1 * | 8/2002 | Gisin | H04L 9/0852 |
| | | | 380/278 |
| 8,289,521 B2 | 10/2012 | Blin et al. | |
| 10,228,250 B2 | 3/2019 | Chamoun et al. | |
| 11,231,278 B1 * | 1/2022 | Digonnet | H04B 10/503 |
| 2006/0153269 A1 * | 7/2006 | Lakestani | G01N 25/18 |
| | | | 374/E17.015 |
| 2017/0115546 A1 * | 4/2017 | Doi | G02F 1/2255 |
| 2017/0155452 A1 * | 6/2017 | Nagra | G02F 1/025 |
| 2018/0292516 A1 * | 10/2018 | Xu | G01S 17/10 |
| 2019/0316907 A1 | 10/2019 | Khan et al. | |
| 2021/0184774 A1 * | 6/2021 | Zhou | G02F 1/225 |
| 2022/0260373 A1 | 8/2022 | Paniccia et al. | |

* cited by examiner

300

400

OPT$_{MOD}$ → 402 OPTICAL ISOLATOR → OPT$_{MOD}$ → 404 OPTICAL COUPLER

OPT$_{MOD}$ / OPT$_{CMB}$ ↔ 406 MIOC

OPT$_{MOD1}$ OPT$_{MOD2O}$ OPT$_{MOD2}$ OPT$_{MOD1O}$ → 410 COIL

408 PHOTO-DETECTOR ← OPT$_{CMB}$

PHDIFF ↓

412 GYROSCOPE CONTROLLER → ROT

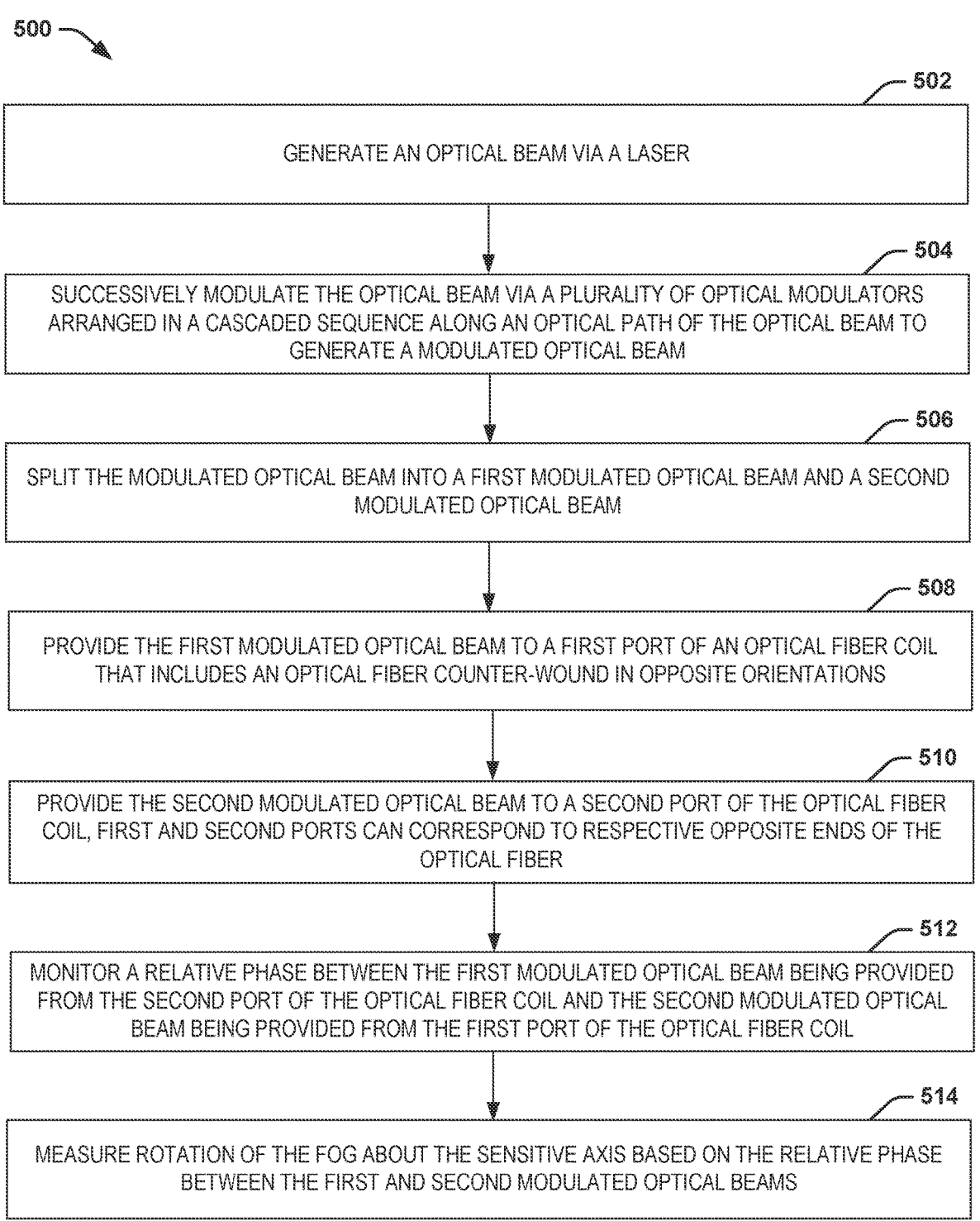

500

502
GENERATE AN OPTICAL BEAM VIA A LASER

504
SUCCESSIVELY MODULATE THE OPTICAL BEAM VIA A PLURALITY OF OPTICAL MODULATORS ARRANGED IN A CASCADED SEQUENCE ALONG AN OPTICAL PATH OF THE OPTICAL BEAM TO GENERATE A MODULATED OPTICAL BEAM

506
SPLIT THE MODULATED OPTICAL BEAM INTO A FIRST MODULATED OPTICAL BEAM AND A SECOND MODULATED OPTICAL BEAM

508
PROVIDE THE FIRST MODULATED OPTICAL BEAM TO A FIRST PORT OF AN OPTICAL FIBER COIL THAT INCLUDES AN OPTICAL FIBER COUNTER-WOUND IN OPPOSITE ORIENTATIONS

510
PROVIDE THE SECOND MODULATED OPTICAL BEAM TO A SECOND PORT OF THE OPTICAL FIBER COIL, FIRST AND SECOND PORTS CAN CORRESPOND TO RESPECTIVE OPPOSITE ENDS OF THE OPTICAL FIBER

512
MONITOR A RELATIVE PHASE BETWEEN THE FIRST MODULATED OPTICAL BEAM BEING PROVIDED FROM THE SECOND PORT OF THE OPTICAL FIBER COIL AND THE SECOND MODULATED OPTICAL BEAM BEING PROVIDED FROM THE FIRST PORT OF THE OPTICAL FIBER COIL

514
MEASURE ROTATION OF THE FOG ABOUT THE SENSITIVE AXIS BASED ON THE RELATIVE PHASE BETWEEN THE FIRST AND SECOND MODULATED OPTICAL BEAMS

FIG. 5

CASCADED OPTICAL MODULATION SYSTEM

TECHNICAL FIELD

This disclosure relates to sensors, and more particularly to cascaded optical modulation systems.

BACKGROUND

Fiber-optic gyroscope (FOG) coils are generally controlled by one or more control loops where light traveling in opposite directions is applied to the coil and recombined via a reciprocal interferometer to determine parameters such as rotation rate and angular position changes. As an example, rotation of the coil about an axis can lead to a phase difference between the counter-rotating optical beams. In order to prevent secondary reflections in the optical system caused by splices, connectors, etc., from creating secondary interferometers which could desensitize the desired signal, a short coherence-length optical source is typically used, such as a super-luminescent diode (SLD). However, SLDs can limit FOG performance due to their relatively poor stability relative to lasers.

One approach to achieve the stability benefits of a laser while also achieving the short coherence length of an SLD is to phase-modulate a laser source utilizing an electro-optic phase modulator over many radians with a noise-like input signal. However, limitations in wide bandwidth electro-optic modulator (EOM) sensitivity require high input drive levels, and the EOM power dissipation limits result in relatively small allowable phase excursions. In addition, high RF power output amplifiers have distortion which can cause an increase in the coherence of the optical output. The modulated optical beam provided to the FOG coil can improve the observability of a FOG rotation signal, as well as other signals for other types of optical sensors. In some examples, random phase modulation (RPM) may be employed, but in other cases, different types of modulation can be utilized. In the example of RPM, an automatic gain control (AGC) loop can be employed to maintain unity gain around the primary (rate) servo loop for the FOG to maximize bandwidth.

SUMMARY

One example includes an optical system. The system includes a laser configured to generate an optical beam and an optical modulation system comprising a plurality of optical modulators arranged in a cascaded sequence. Each of the optical modulators can be configured to provide successive modulation of the optical beam in the cascaded sequence to provide a modulated optical beam. The system further includes an optical assembly configured to receive the modulated optical beam and to implement the modulated optical beam for an optical functional application.

Another example includes a method for determining rotation about a sensitive axis for a FOG system. The method includes generating an optical beam via a laser and successively modulating the optical beam via a plurality of optical modulators arranged in a cascaded sequence along an optical path of the optical beam to generate a modulated optical beam. The method also includes splitting the modulated optical beam into a first modulated optical beam and a second modulated optical beam. The method also includes providing the first modulated optical beam to a first port of an optical fiber coil and providing the second modulated optical beam to a second port of the optical fiber coil, the optical fiber coil including an optical fiber counter-wound in opposite orientations. The first and second ports can correspond to respective opposite ends of the optical fiber. The method also includes monitoring a relative phase between the first modulated optical beam being provided from the second port of the optical fiber coil and the second modulated optical beam being provided from the first port of the optical fiber coil. The method further includes measuring rotation of the FOG about the sensitive axis based on the relative phase between the first and second modulated optical beams.

Another example includes a FOG system. The system includes a laser configured to generate an optical beam and an optical modulation system. The optical modulation system includes a modulation controller configured to generate a digital pseudo-random noise (PRN) signal and to condition the digital PRN signal in each of a plurality of digital modulation paths to provide a respective plurality of digital modulation signals. The optical modulation system further includes a plurality of optical modulators arranged in a cascaded sequence. Each of the optical modulators can be configured to provide successive modulation of the optical beam in the cascaded sequence to provide a modulated optical beam. The system further includes a FOG assembly comprising an optical fiber coil. The FOG assembly can be configured to measure rotation about a sensitive axis associated with the optical fiber coil based on a relative phase difference of the modulated optical beam propagating in each of opposite directions through the optical fiber coil.

BRIEF DESCRIPTION OF THE DRAWINGS

FIG. 5 illustrates an example of a method for determining rotation about a sensitive axis for a fiber-optic gyroscope (FOG) system.

DETAILED DESCRIPTION

Figure 1:
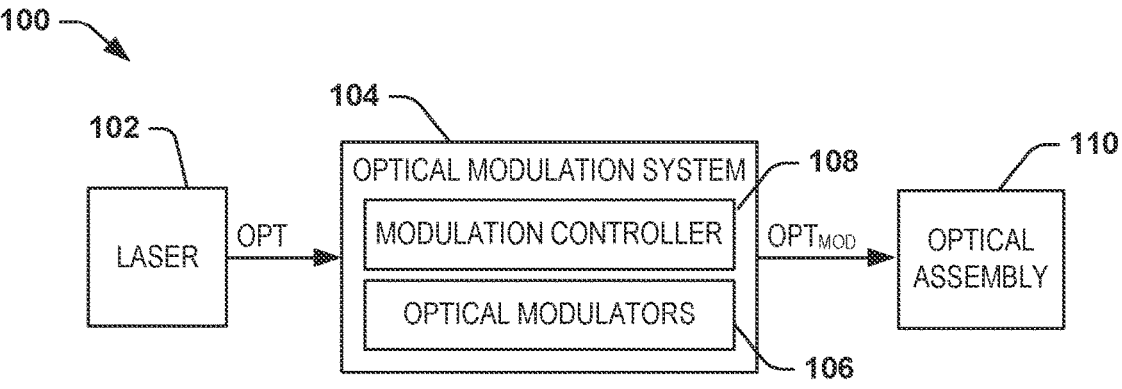
FIG. 1 illustrates an example block diagram of an optical system.

This disclosure relates to sensors, and more particularly to cascaded optical modulation system. The optical system includes a light source (e.g., a broadband light source or a laser) configured to generate an optical beam. The optical beam is provided to an optical beam modulator that is configured to provide successive modulation of the optical beam via a plurality of optical modulators to generate a modulated optical beam. The modulated optical beam can thus be split and provided to two respective ports of an optical fiber coil.

By modulating the optical beam, the narrow frequency bandwidth can be broadened to mitigate noise, such as backscatter noise and polarization nonreciprocal coupling (PNR) that can result in errors (e.g., gyroscope bias drift). However, providing a single stage of modulation of the optical beam, while effective for broadening the frequency spectrum of the optical beam, can be insufficient to attenuate the carrier signal at the center frequency from being provided in the modulated optical beam. Therefore, with a single stage of modulation of the optical beam, the carrier signal provided in the modulated optical beam provided to an optical assembly can result in leakage. Careful tuning of the modulation amplitude to a very specific value that minimizes the carrier leakage can be utilized, but such an approach is highly sensitive to changes in modulator or drive amplitude characteristics. Additionally, the carrier signal cannot be suppressed merely by increasing the carrier attenuation provided by the single stage of modulation based on driving the radio frequency (RF) power amplifier of the optical modulator to a larger amplitude as this can cause saturation, resulting in potential changes to the Gaussian characteristic of the modulation signal and the creation of a bimodal signal characteristic of the modulated optical beam.

To provide for modulation of the optical beam in a manner that sufficiently suppresses the carrier signal while operating the optical modulation at lower drive levels, the FOG system described herein includes a plurality of cascaded optical modulators. As an example, each of the optical modulators can be configured as electro-optic modulators (EOMs) that are each configured to modulate a phase of the optical beam, thereby each providing an individual contribution to the suppression of the carrier signal of the optical beam. To maintain proper widening of the bandwidth of the optical beam with carrier suppression, the optical modulators can include delays after a first one of the optical modulators to align the modulation to a given one phase of the optical beam. Accordingly, the optical modulators can each provide an approximately equal phase-modulation of a same phase of the optical beam. As an example, the modulation signal that is provided to the optical modulators can be generated as a digital pseudo-random noise (PRN) signal that is conditioned in each of a plurality of modulation paths for each of the respective optical modulators to provide greater control of the modulation and delay times provided to the optical modulators.

As an example described in greater detail herein, the cascaded optical modulation system can be implemented in a fiber-optic gyroscope (FOG). For example, a FOG can measure angular rotation using light transmitted through a fiber optic coil of the FOG and use the Sagnac effect to sense the angular rotation. The optical fiber coil can include an optical fiber that is counter-wound around a spool in both a first orientation and a second orientation opposite the first orientation, such that the optical beams are provided in opposite directions through optical fiber of the FOG. Due to the Sagnac effect, the optical beam that is traveling against rotation of the FOG experiences a slightly shorter optical path than the other optical beam, thus creating a phase difference in the optical beams exiting the FOG. The resulting difference (e.g., differential phase shift) is given by the Sagnac scale factor (SSF) times the angular rate and can be used to calculate the rotation (e.g., rate) of the FOG. By implementing the cascaded modulation scheme described herein, the FOG can operate in a manner that mitigates leakage of the optical beam as a function of non-linearity and/or saturation of drive amplifiers associated with the optical modulators.

FIG. 1 illustrates an example of an optical system 100. The optical system 100 can be used in any of a variety of optical applications, such as a fiber-optic gyroscope (FOG) in which precise measurement of rotation of a platform is required. For example, the optical system 100 can be implemented in vehicular navigation, such as in aerospace or nautical vehicular applications as a part of an inertial navigation system (INS).

The optical system 100 includes a laser 102 configured to generate an optical beam OPT. As an example, the optical beam OPT generated by the laser 102 can have a narrow frequency bandwidth to exhibit scale factor stability (e.g., less than 0.1 ppm) and a very low relative intensity noise (RIN). The optical beam OPT is provided (e.g., via an optical fiber) to an optical modulation system 104. The optical modulation system 104 is configured to provide modulation (e.g., phase modulation) of the optical beam OPT to generate a modulated optical beam $OPT_{MOD}$. In the example of FIG. 1, the optical modulation system includes a plurality of optical modulators 106 and a modulation controller 108. The optical modulators 106 can be provided in a cascaded arrangement in an optical path of the optical beam OPT, such that each of the optical modulators 106 can provide successive modulation of the optical beam OPT based on a modulation signal generated by the modulation controller 108. As an example, each of the optical modulators 106 is configured to provide an approximately equal phase-shift (e.g., a 1/N phase-shift for N optical modulators 106) at a same phase of the optical beam OPT. In other examples, the phase-shifts can be different and can affect different phases of the optical beam OPT.

As an example, the modulation controller 108 can be configured to generate the modulation signal as an approximately Gaussian noise signal, such that the approximately Gaussian noise signal can be split and provided to each of the optical modulators 106. For example, the approximately Gaussian noise signal can be provided from a digital broadband noise source, such that the digital broadband noise source can generate a digital Gaussian signal or a digital pseudo-random noise (PRN) signal that can simulate a Gaussian noise signal. Therefore, the Gaussian noise signal can be split and conditioned in each of a plurality of modulation paths to each of the respective optical modulators 106. Therefore, the cascaded arrangement of the optical modulators 106 can provide successive modulation to the optical beam OPT to broaden the frequency bandwidth and to suppress the carrier signal in providing the modulated optical beam $OPT_{MOD}$. As another example, a continuous noise source such as a noise diode can be implemented to generate the Gaussian noise signal.

As described herein, the modulation of the optical beam OPT by the optical modulators 106 can provide suppression of the carrier signal of the optical beam OPT. As an example, the optical modulators 106 can achieve carrier suppression by spreading the energy in the carrier signal across the wider bandwidth, thereby attenuating the carrier signal itself. Because each of the optical modulators 106 can provide approximately equal modulation to the optical beam OPT, each of the optical modulators 106 can provide a same amount of carrier attenuation to the optical beam OPT (e.g., approximately 20 dB) in succession. Therefore, the cascaded optical modulators 106 can provide a cumulative attenuation of the carrier signal in the optical beam OPT to sufficiently suppress the carrier signal of the optical beam OPT in generating the modulated optical beam $OPT_{MOD}$. Additionally, by providing incremental attenuation in the cascaded sequence to provide a larger cumulative attenuation, the optical modulators 106 can provide sufficient attenuation to suppress the carrier signal without operating in saturation. For example, the optical modulators 106 can each operate at significantly less power (e.g., $20*\log_{10}(N)$ dB for each of a quantity N of optical modulators 106) than what would otherwise be required to accomplish a same amount of carrier suppression, thus mitigating saturation of any of the optical modulators. Furthermore, the collective cascaded arrangement of the optical modulators 106 can exhibit significantly less distortion (e.g., $40*\log_{10}(N)$ dB for a quantity N of optical modulators 106) than a single optical modulator to achieve carrier suppression.

As described above, each of the optical modulators 106 is configured to provide an approximately equal phase-shift at a same phase of the optical beam OPT in succession (e.g., a 1/N phase-shift for N optical modulators 106 to maintain a same bandwidth of a single optical modulator). Therefore, each of the optical modulators 106 is configured to modulate the optical beam OPT equally based on the same modulation signal provided by the modulation controller 108 on the respective modulation paths. However, based on the cascaded arrangement of the optical modulators 106, and therefore the successive modulation of the optical beam OPT by the optical modulators 106, the optical modulation system 104 can include at least one delay element to align the phase-modulation provided by optical modulators 106 to the same phase of the optical beam OPT. As described herein, the term "delay element" can refer to any application of delay of the signal, such as based on physical delay (e.g., adding buffers in the modulation path or providing a longer signal propagation path) or, in the digital domain, can be based on a time delay in applying the digital Gaussian noise signal in each modulation paths to the optical modulators 106. For example, the delay element(s) can provide successive delay of the modulation approximately equal to the optical propagation delay of the optical beam OPT through each of the successive optical modulators 106. Therefore, the successive modulation of the optical beam OPT by each of the optical modulators 106 can be the same phase-shift provided to the same optical beam phase based on the provided delay. However, the phase-shifts could alternatively be different and could be provided to affect different phases of the optical beam OPT.

In the example of FIG. 1, the modulated optical beam $OPT_{MOD}$ is provided to an optical assembly 110. The optical assembly 110 is configured to utilize the modulated optical beam $OPT_{MOD}$ for an optical functional application using a broader spectrum beam that does not have significant residual narrowband carrier content. The optical functional application can thus require modulation (e.g., phase modulation) of an optical beam, such as for calculating a measurable parameter with high precision. As an example, the optical assembly 110 can be configured as a FOG that is configured to determine a rotation of the optical system 100 about a sensitive axis. For example, the optical system 100 can be configured as an interferometric FOG (iFOG) that uses interferometry to determine the rotation of the optical system 100 about the sensitive axis based on the Sagnac effect.

In the example of the optical assembly 110 being configured as a FOG assembly, the modulated optical beam $OPT_{MOD}$, having a broadened frequency band and a suppressed carrier signal relative to the optical beam, is provided to the FOG assembly. The FOG assembly can include a fiber coil, a photodetector, and a gyroscope controller. The fiber coil can be fabricated as an optical fiber that is counter-wound about a spool and includes a first port and a second port. The modulated optical beam $OPT_{MOD}$ can be split into two equal modulated optical beams and provided to the respective first and second ports. Thus, the two equal modulated optical beams can counter-propagate around the fiber coil to exit the second port and the first port, respectively. The photodetector is configured to monitor the two modulated optical beams exiting the fiber coil to detect a phase difference between the two modulated optical beams. The gyroscope controller is therefore configured to determine rotation of the fiber coil about a sensitive axis based on a detected phase difference between the two modulated optical beams. Because the modulated optical beam OPT- $_{MOD}$ is frequency broadened and has a suppressed carrier signal, the optical system 100 can operate in a manner that mitigates leakage of the optical beam OPT as a function of non-linearity and/or saturation of the drive amplifiers associated with the optical modulators 106.

Figure 2:
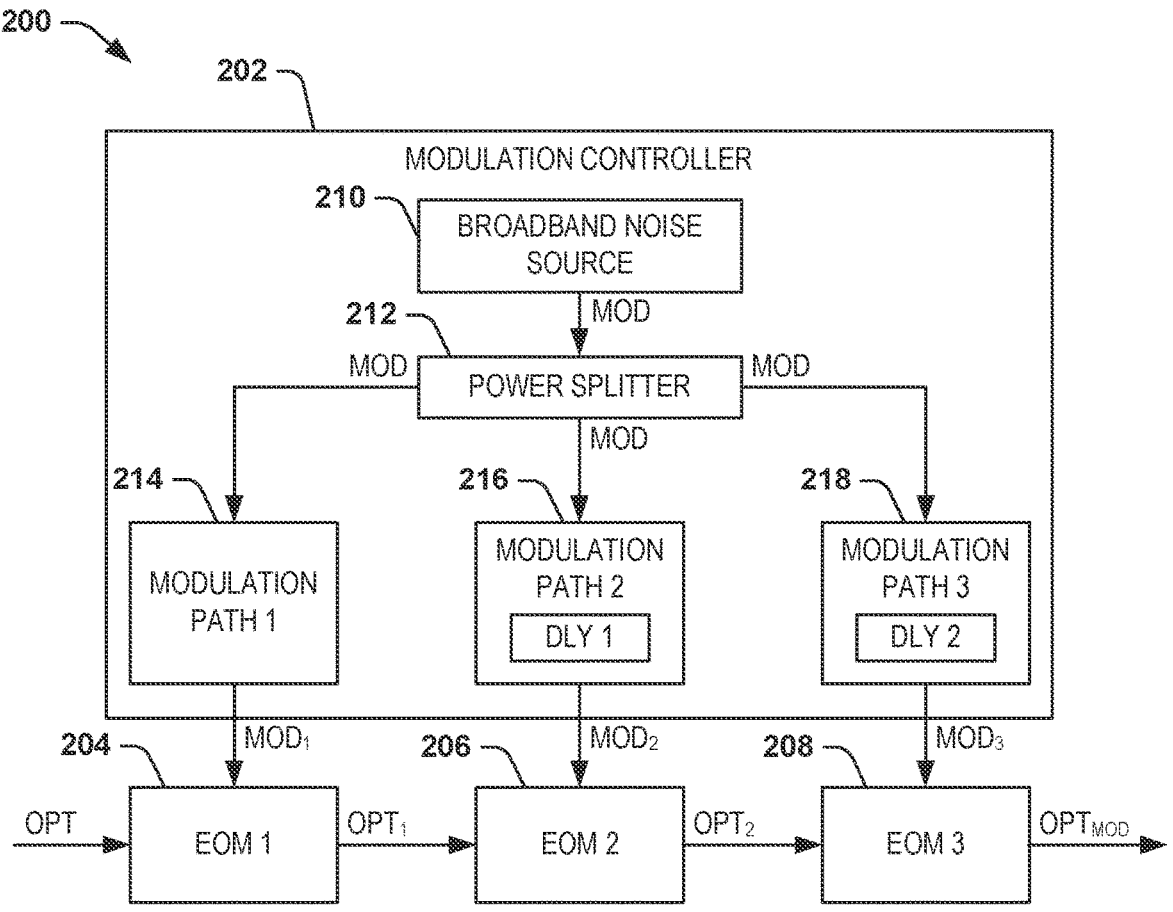
FIG. 2 illustrates an example block diagram of an optical modulation system.

FIG. 2 illustrates an example block diagram of an optical modulation system 200. The optical modulation system 200 can correspond to the optical modulation system 104 in the example of FIG. 1. Therefore, reference is to be made to the example of FIG. 1 in the following description of the example of FIG. 2.

The optical modulation system 200 includes a modulation controller 202 and a plurality of optical modulators, demonstrated as a first optical modulator 204, a second optical modulator 206, and a third optical modulator 208. The optical modulators 204, 206, and 208 are demonstrated as electro-optic modulators (EOMs) that are arranged in a cascaded sequence in an optical path of an optical beam OPT, such as generated by the laser 102. Similar to as described above, the optical modulators 204, 206, and 208 can be configured to successively modulate the optical beam OPT to generate a modulated optical beam $OPT_{MOD}$. In the example of FIG. 2, the first optical modulator 204 is configured to modulate the optical beam OPT via a first modulation signal MOD1 to generate a first iteration modulated optical beam $OPT_1$, and the second optical modulator 206 is configured to modulate the first iteration modulated optical beam $OPT_1$ via a second modulation signal $MOD_2$ to generate a second iteration modulated optical beam $OPT_2$. The third optical modulator 208 is configured to modulate the second iteration modulated optical beam $OPT_2$ via a third modulation signal $MOD_3$ to generate the modulated optical beam $OPT_{MOD}$ that is fully modulated, and thus has a broadened frequency bandwidth and a suppressed carrier signal.

The modulation controller 202 includes a broadband noise source 210 that is configured to generate a modulation signal MOD. As an example, the broadband noise source 210 can be configured as a Gaussian noise source (e.g., a noise diode), or can be configured as a conditioned digital PRN signal source. For example, the broadband noise source 210 can be configured as a field-programmable gate array (FPGA) device. Therefore, the modulation signal MOD can correspond to a digital Gaussian signal, or can correspond to a digital PRN signal that can approximate or simulate a Gaussian noise signal, that is implemented to phase-modulate the optical beam OPT. The modulation signal MOD is provided to a power splitter 212 to split the modulation signal MOD into three equal copies of the modulation signal MOD. A first copy of the modulation signal MOD is provided to a first modulation path 214, a second copy of the modulation signal MOD is provided to a second modulation path 216, and a third copy of the modulation signal MOD is provided to a third modulation path 218.

The modulation paths 214, 216, and 218 are configured to filter and condition the modulation signal MOD. As an example, each of the modulation paths 214, 216, and 218 include a sequence of drivers, amplifiers, filters, and/or attenuators configured to condition the modulation signal MOD. In the example of FIG. 2, the first modulation path 214 is configured to provide a first modulation signal $MOD_1$ to the first optical modulator 204, the second modulation path 216 is configured to provide a second modulation signal $MOD_2$ to the second optical modulator 206, and the third modulation path 216 is configured to provide a third modulation signal $MOD_3$ to the third optical modulator 208. All of the conditioning elements of the first, second, and third modulation paths 214, 216, and 218 can be the same, such that the first, second, and third modulation signals $MOD_1$, $MOD_2$, and $MOD_3$ can be approximately identical. Therefore, each of the optical modulators 204, 206, and 208 is configured to provide a same modulation (e.g., phase-shift) to the optical beam OPT in the cascaded sequence. While the example of FIG. 2 demonstrates three cascaded optical modulators, the optical modulation system can instead include two cascaded optical modulators, or more than three cascaded optical modulators, as described herein.

As described above, each of the optical modulators 204, 206, and 208 can be configured to provide an approximately equal phase-shift at a same phase of the optical beam OPT in succession. Based on the cascaded sequence of the optical modulators 204, 206, and 208, the each of the optical modulators after the first optical modulator in the cascaded sequence can be delayed in providing the modulation to the optical beam OPT. In the example of FIG. 2, the first modulation path 214 is configured to provide the first modulation signal $MOD_1$ to the first optical modulator 204 without any delay. The second modulation path 216 includes a first delay element 220 that is configured to provide a first predefined delay in providing the second modulation signal $MOD_2$ to the second optical modulator 206. Similarly, the third modulation path 218 includes a second delay element 222 that is configured to provide a second predefined delay in providing the third modulation signal $MOD_3$ to the third optical modulator 208.

The first and second predefined delays can each be based on an optical propagation path of the optical beam OPT. As described above, the first modulation path 214 is configured to provide the first modulation signal $MOD_1$ to the first optical modulator 204 without any delay. However, to ensure that the second modulation signal $MOD_2$ provides the same modulation as the first modulation signal $MOD_1$, the first delay element 220 can delay the second modulation signal $MOD_2$ by a time that is approximately equal to the optical propagation time of the first iteration optical beam $OPT_1$ between the first optical modulator 204 and the second optical modulator 206. Therefore, the second optical modulator 206 can provide a same phase-shift at the same phase of the first iteration optical beam $OPT_1$ via the second modulation signal $MOD_2$ as the first optical modulator 204 via the first modulation signal $MOD_1$. Similarly, to ensure that the third modulation signal $MOD_3$ provides the same modulation as the first and second modulation signals $MOD_1$ and $MOD_2$, the second delay element 222 can delay the third modulation signal $MOD_3$ by a time that is approximately equal to the optical propagation time of the first iteration optical beam $OPT_1$ between the first optical modulator 204 and the second optical modulator 206 and the optical propagation time of the second iteration optical beam $OPT_2$ between the second optical modulator 206 and the third optical modulator 208. Therefore, the third optical modulator 208 can provide a same phase-shift at the same phase of the second iteration optical beam $OPT_2$ via the third modulation signal $MOD_3$ as the first optical modulator 204 via the first modulation signal $MOD_1$ and as the second optical modulator 206 via the second modulation signal $MOD_2$.

Each of the optical modulators 204, 206, and 208 can provide the successive modulation of the optical beam OPT to provide the modulated optical beam $OPT_{MOD}$ as having a broadened frequency bandwidth and a suppressed carrier signal relative to the optical beam OPT. Each of the optical modulators 204, 206, and 208 can each provide an approximately equal carrier suppression to the optical beam OPT in the sequence, resulting in a cumulative carrier suppression that is sufficient to suppress the carrier signal without saturating the modulation signals in the respective modulation paths 214, 216, and 218. Therefore, the modulated optical beam $OPT_{MOD}$ can be provided to the optical assembly 110, such as to mitigate carrier leakage into the modulated optical beam $OPT_{MOD}$.

Figures 3, 4:
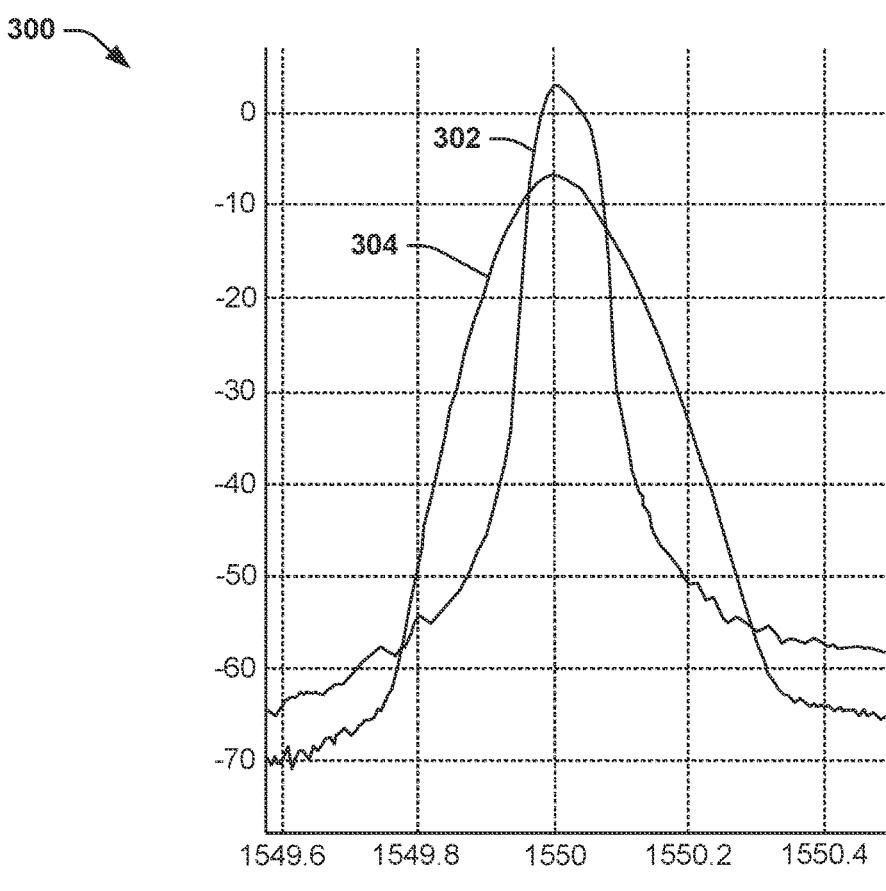
FIG. 3 illustrates an example diagram of optical beams.
FIG. 4 illustrates an example block diagram of a FOG assembly.

FIG. 3 illustrates an example diagram 300 of optical beams. The diagram 300 demonstrates the wavelength spectrum of optical beam OPT at 302, and demonstrates the wavelength spectrum of modulated optical beam $OPT_{MOD}$ at 304. Therefore, the optical beam 302 corresponds to the optical beam OPT that is input to the optical modulator 204, and the modulated optical beam 304 corresponds to the modulated optical beam $OPT_{MOD}$ output from the optical modulator 208. The optical beams 302 and 304 are plotted as an intensity relative to wavelength (in μm). Each of the optical beams 302 and 304 are demonstrated as having a center wavelength of 1550 μm. After modulation of the optical beam 302 by the cascaded optical modulators, the modulated optical beam 304 has a frequency bandwidth that is approximately 4.7 GHz broader than the frequency bandwidth of the optical beam 302. Additionally, after modulation of the optical beam 302 by the cascaded optical modulators, the carrier signal of the optical beam 302 has been broadened, and the central peak of the optical beam 302 has been suppressed, as demonstrated in the modulated optical beam 304. As a result the modulated optical beam 304 has a spectrum that approximates a Gaussian signal, as desired.

FIG. 4 illustrates an example block diagram of a FOG assembly 400. The FOG assembly 400 can correspond to the optical assembly 110 in the example of FIG. 1. Therefore, reference is to be made to the example of FIG. 1 in the following description of the example of FIG. 4.

The FOG assembly 400 includes an optical isolator 402 that receives the modulated optical beam $OPT_{MOD}$ at an input and provides the modulated optical beam $OPT_{MOD}$ from an output. The optical isolator 402 is configured to provide optical isolation to prevent optical energy from propagating backward from the output through the optical isolator to the input. The modulated optical beam $OPT_{MOD}$ is provided from the optical isolator 402 to an optical coupler 404. The optical coupler 404 is configured to output the modulated optical beam $OPT_{MOD}$ from a first port to a multifunction integrated optical chip (MIOC) 406, to receive a combined optical beam $OPT_{CMB}$ at the first port, and to output the combined optical beam $OPT_{CMB}$ from a second port to a photodetector 408. The MIOC 406 can also provide phase adjustments to the first and second modulated optical beams $OPT_{MOD1}$ and $OPT_{MOD2}$.

The MIOC 406 is configured to split the modulated optical beam $OPT_{MOD}$ into a first modulated optical beam $OPT_{MOD1}$ and a second modulated optical beam $OPT_{MOD2}$ that are provided to respective first and second ports of a fiber coil 410. The first and second modulated optical beams $OPT_{MOD1}$ and $OPT_{MOD2}$ are configured to counter-propagate around the fiber coil 410. The first modulated optical beam $OPT_{MOD1}$ is provided as an output from the second port of the fiber coil 410 as a first modulated optical beam $OPT_{MOD1O}$, and the second modulated optical beam $OPT_{MOD2}$ is provided as an output from the first port of the fiber coil 410 as a second modulated optical beam $OPT_{MOD2O}$. The first and second modulated optical beams $OPT_{MOD1O}$ and $OPT_{MOD2O}$ are provided from the fiber coil 410 back to the MIOC 406 to be combined as the combined optical beam $OPT_{CMB}$.

As described above, the combined optical beam $OPT_{CMB}$ is provided to the optical coupler 404 and is output to the photodetector 408. The photodetector 408 is configured to monitor the combined optical beam $OPT_{CMB}$ to determine a relative phase between the first and second modulated optical beams $OPT_{MOD1O}$ and $OPT_{MOD2O}$. The relative phase between the first and second modulated optical beams $OPT_{MOD1O}$ and $OPT_{MOD2O}$ can be indicative of rotation of the fiber coil 410 about a sensitive axis. The photodetector 408 is configured to generate a signal PHDIFF that can correspond to the relative phase between the first and second modulated optical beams $OPT_{MOD1O}$ and $OPT_{MOD2O}$. The signal PHDIFF is provided to a gyroscope controller 412. The gyroscope controller 412 is configured to determine the rotation about the sensitive axis, demonstrated as a signal ROT, based on the signal PHDIFF.

As described above, the modulated optical beam $OPT_{MOD}$ can have a broadened frequency bandwidth and a suppressed carrier signal. Therefore, the rotation about the sensitive axis ROT can be provided more accurately based on mitigating backscatter and PNR, as well as insertion losses. Thus, by modulating the optical beam OPT via the cascaded optical modulators to provide the modulated optical beam $OPT_{MOD}$, the carrier signal of the optical beam OPT can be sufficiently suppressed to mitigate insertion losses without saturating the drive amplifiers of the optical modulators. Accordingly, the rotation about the sensitive axis ROT can be provided in a more accurate manner relative to typical FOG systems that employ single stage optical modulation.

In view of the foregoing structural and functional features described above, an example method will be better appreciated with reference to FIG. 5. While, for purposes of simplicity of explanation, the method is shown and described as executing serially, it is to be understood and appreciated that the method is not limited by the illustrated order, as parts of the method could occur in different orders and/or concurrently from that shown and described herein. Such method can be executed by various components configured in an integrated circuit, processor, or a controller, for example.

FIG. 5 illustrates an example of a method 500 for determining rotation about a sensitive axis for a FOG system (e.g., the optical system 100). At 502, an optical beam (e.g., the optical beam OPT) is generated via a laser (e.g., the laser 102). At 504, the optical beam is successively modulated via a plurality of optical modulators (e.g., the optical modulators 106) arranged in a cascaded sequence along an optical path of the optical beam to generate a modulated optical beam (e.g., the modulated optical beam $OPT_{MOD}$). At 506, the modulated optical beam is split into a first modulated optical beam (e.g., the modulated optical beam $OPT_{MOD1}$) and a second modulated optical beam (e.g., the modulated optical beam $OPT_{MOD2}$). At 508, the first modulated optical beam is provided to a first port of an optical fiber coil (e.g., the fiber coil 410) that includes an optical fiber counter-wound in opposite orientations. At 510, the second modulated optical beam is provided to a second port of the optical fiber coil, the first and second ports can correspond to respective opposite ends of the optical fiber. At 512, a relative phase between the first modulated optical beam being provided from the second port of the optical fiber coil and the second modulated optical beam being provided from the first port of the optical fiber coil is monitored. At 514, rotation of the FOG system about the sensitive axis is measured based on the relative phase between the first and second modulated optical beams.

What has been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. An optical system comprising:
a laser configured to generate an optical beam;
an optical modulation system comprising a plurality of optical modulators arranged in a cascaded sequence, each of the optical modulators being configured to provide successive modulation of the optical beam in the cascaded sequence to provide a modulated optical beam by providing an approximately equal amount of phase-shift to a same phase of the optical beam in succession in the cascaded sequence; and
an optical assembly configured to receive the modulated optical beam and to implement the modulated optical beam for an optical functional application.

2. The system of claim 1, wherein each of the optical modulators in the cascaded sequence after a first one of the optical modulators is configured to provide a successively increasing amount of delay to the modulation of the optical beam to provide the modulated optical beam.

3. The system of claim 1, wherein the optical modulation system comprises a modulation controller configured to generate an approximately Gaussian noise signal, such that each of the optical modulators is configured to provide the successive modulation based on the approximately Gaussian noise signal.

4. The system of claim 3, wherein the optical modulation system comprises a broadband noise source configured to generate the approximately Gaussian noise signal as a digital pseudo-random noise (PRN) signal and to condition the digital PRN signal in each of a plurality of digital modulation paths to provide a respective plurality of modulation signals to the respective optical modulators.

5. The system of claim 4, wherein the optical modulation system further comprises at least one delay element, each of the at least one delay element being arranged in a respective one of the digital modulation paths and being configured to delay the respective one of the digital modulation signals.

6. The system of claim 5, wherein each of the at least one delay element is configured to provide an amount of delay of the respective one of the digital modulation signals approximately equal to a propagation time of the optical beam from a first one of the optical modulators to the respective one of the optical modulators to which the respective one of the delayed digital modulation signals is provided.

7. The system of claim 1, wherein the optical modulators are each configured as electro-optic modulators (EOMs) configured to modulate a phase of the optical beam.

8. The system of claim 1, wherein the cascaded sequence of the optical modulators is configured to modulate the optical beam to broaden a frequency bandwidth of the optical beam and to suppress a carrier signal amplitude of the optical beam.

9. The system of claim 1, wherein the optical assembly is configured as a fiber-optic gyroscope (FOG) assembly comprising an optical fiber coil, wherein the FOG assembly is configured to measure rotation about a sensitive axis associated with the optical fiber coil based on a relative phase difference of the modulated optical beam propagating in each of opposite directions through the optical fiber coil.

10. The system of claim 9, wherein the FOG assembly further comprises:
    an optical coupler configured to receive the modulated optical beam at a first port, to provide the modulated optical beam from a second port, and to receive a combined output beam at the second port;
    a multifunction integrated optical chip (MIOC) configured to split the modulated optical beam into a first modulated optical beam and a second modulated optical beam, the first modulated optical beam being provided to a first port of the optical fiber coil and the second modulated optical beam being provided to a second port of the optical fiber coil, the MIOC being further configured to combine the first modulated optical beam provided from the second port of the optical fiber coil and the second modulated optical beam provided from the first port of the optical fiber coil to provide the combined output beam;
    a photodetector coupled to a third port of the optical coupler and configured to monitor the combined output beam; and
    a controller configured to determine the rotation about the sensitive axis based on the monitored combined output beam.

11. A method for determining rotation about a sensitive axis for a fiber-optic gyroscope (FOG) system, the method comprising:
    generating an optical beam via a laser;
    successively modulating the optical beam via a plurality of optical modulators arranged in a cascaded sequence along an optical path of the optical beam to generate a modulated optical beam by providing an approximately equal amount of phase-shift to a same phase of the optical beam in succession in the cascaded sequence;
    splitting the modulated optical beam into a first modulated optical beam and a second modulated optical beam;
    providing the first modulated optical beam to a first port of an optical fiber coil comprising an optical fiber counter-wound in opposite orientations;
    providing the second modulated optical beam to a second port of the optical fiber coil, the first and second ports corresponding to respective opposite ends of the optical fiber;
    monitoring a relative phase between the first modulated optical beam being provided from the second port of the optical fiber coil and the second modulated optical beam being provided from the first port of the optical fiber coil; and
    measuring rotation of the FOG about the sensitive axis based on the relative phase between the first and second modulated optical beams.

12. The method of claim 11, wherein successively modulating the optical beam comprises generating a plurality of modulation signals, each of the modulation signals being associated with one of the respective plurality of optical modulators.

13. The method of claim 12, wherein successively modulating the optical beam further comprises delaying each of the modulation signals provided to the optical beam relative to providing a previous one of the modulation signals after a first one of the optical modulators to provide a successively increasing amount of delay to the modulation of the optical beam to provide the modulated optical beam.

14. The method of claim 11, wherein successively modulating the optical beam comprises:
    generating a Gaussian noise signal; and
    conditioning the Gaussian noise signal in each of a plurality of digital modulation paths to provide a respective plurality of digital modulation signals associated with the Gaussian noise signal to the respective optical modulators.

15. A fiber-optic gyroscope (FOG) system comprising:
    a laser configured to generate an optical beam;
    an optical modulation system comprising:
        a modulation controller configured to generate a digital Gaussian noise signal and to condition the digital Gaussian noise signal in each of a plurality of digital modulation paths to provide a respective plurality of digital modulation signals; and
        a plurality of optical modulators arranged in a cascaded sequence, each of the optical modulators being configured to provide successive modulation of the optical beam in the cascaded sequence to provide a modulated optical beam by providing an approximately equal amount of phase shift to a same phase of the optical beam in succession in the cascaded sequence; and
    a FOG assembly comprising an optical fiber coil, the FOG assembly being configured to measure rotation about a sensitive axis associated with the optical fiber coil based on a relative phase difference of the modulated optical beam propagating in each of opposite directions through the optical fiber coil.

16. The system of claim 15, wherein the optical modulation system comprises at least one delay element, each of the at least one delay element being arranged in a respective one of the digital modulation paths and being configured to delay the respective one of the digital modulation signals, wherein each of the at least one delay element is configured to provide an amount of delay of the respective one of the digital modulation signals approximately equal to a propagation time of the optical beam from a first one of the optical modulators to the respective one of the optical modulators to which the respective one of the delayed digital modulation signals is provided.

17. The system of claim 15, wherein the optical modulators are each configured as electro-optic modulators (EOMs) configured to modulate a phase of the optical beam.

18. The system of claim 15, wherein the cascaded sequence of the optical modulators is configured to modulate the optical beam to broaden a frequency bandwidth of the optical beam and to suppress a carrier signal amplitude of the optical beam.

19. The system of claim 15, wherein the FOG assembly further comprises:
    an optical coupler configured to receive the modulated optical beam at a first port, to provide the modulated optical beam from a second port, and to receive a combined output beam at the second port;
    a multifunction integrated optical chip (MIOC) configured to split the modulated optical beam into a first modulated optical beam and a second modulated optical beam, the first modulated optical beam being provided to a first port of the optical fiber coil and the second modulated optical beam being provided to a second port of the optical fiber coil, the MIOC being further configured to combine the first modulated optical beam provided from the second port of the optical fiber coil and the second modulated optical beam provided from the first port of the optical fiber coil to provide the combined output beam;

a photodetector coupled to a third port of the optical coupler and configured to monitor the combined output beam; and a controller configured to determine the rotation about the sensitive axis based on the monitored combined output beam.

* * * * *